United States Patent [19]

Brücher

[11] Patent Number: 4,810,019
[45] Date of Patent: Mar. 7, 1989

[54] MECHANICALLY OPERATED COLLET CHUCK FOR GRIPPING ROUND OBJECTS

[76] Inventor: Eberhard Brücher, Lohweg 35, D-5900 Siegen 1, Fed. Rep. of Germany

[21] Appl. No.: 147,308

[22] Filed: Jan. 22, 1988

[30] Foreign Application Priority Data

Feb. 5, 1987 [DE] Fed. Rep. of Germany ....... 3703453
May 21, 1987 [DE] Fed. Rep. of Germany ....... 3717091

[51] Int. Cl.[4] .......................... B25J 15/00; B66L 1/42
[52] U.S. Cl. .................................. 294/106; 294/86.4; 294/902
[58] Field of Search ................. 294/106, 86.4, 902, 294/16, 99.1, 99.2, 100, 28, 33, 113, 118; 414/408, 409, 422, 555, 303, 621, 620, 619; 269/265, 266, 268, 269, 230

[56] References Cited

U.S. PATENT DOCUMENTS 4,452,479 6/1984 Terai et al. .......................... 294/106
4,718,709 1/1988 Myers et al. ........................ 294/106

FOREIGN PATENT DOCUMENTS 3123897 1/1983 Fed. Rep. of Germany ...... 294/106
2105676 3/1983 United Kingdom ................ 294/106

Primary Examiner—James B. Marbert
Attorney, Agent, or Firm—Young & Thompson

[57] ABSTRACT

Mechanically operated collet chuck for gripping round objects. Especially in automatic, program-controlled installations for the successive machining of round workpieces, a centered gripping of the round objects, which are changing in diameter, is important. The centering error occurring in case of a collet-carrying machine which remains stationary is compensated for by means of link quadrilaterals (3, 8, 10, 12) which latter cause collet jaws (9) pivotably mounted to the front ends of the collet arms (4) and forming four contact points to pivot with respect to the collet arms (4) in such a way that the contact points or contact lines come into contact with the round object (1) simultaneously, without a change in position of the machine or of the round object. The special structure of the collet chuck simplifies program control of the machining unit since the change in diameter undergone by the round object (1) is taken into account in a rugged and purely mechanical fashion by the collet which occupies only a small amount of space.

7 Claims, 1 Drawing Sheet

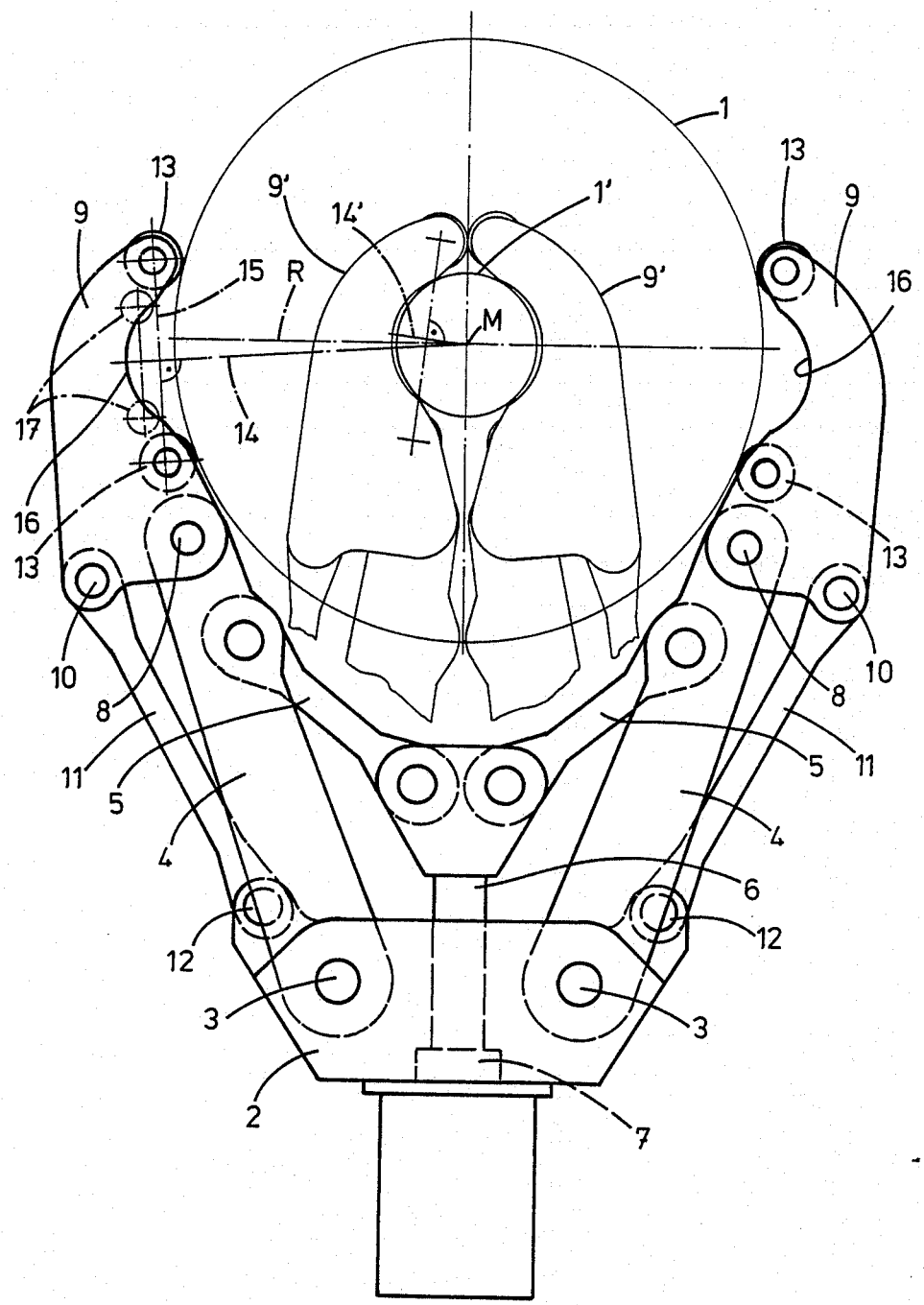

MECHANICALLY OPERATED COLLET CHUCK FOR GRIPPING ROUND OBJECTS

The invention relates to a mechanically operated collet chuck in accordance with the preamble of claim 1.

Such a collet chuck has been known from DOS 3,123,897 and exhibits contact surfaces of a curved design for the compensation of centering errors, which surfaces are arranged at the ends of the collet arms. In this arrangement the contact surface located most remotely from the pivot axis of each collet arm exhibits a concave curvature whereas the contact surface in the closest proximity to the pivot axis extends in a convex fashion. Thereby, an essentially central grip on round workpieces and a rather accurate position of the latter are achieved, even if these workpieces (round components) have their diameter altered within an automatically controlled machining unit with several machining stages.

This conventional collet chuck still has certain centering errors within a still relatively small diameter range of the round objects to be gripped, but these errors can be tolerated in certain practical applications.

The invention is based on the object of constructing the collet chuck of the type in question so that round items within a larger diameter range can be transported, with a further reduced centering error, in a program-controlled machining unit from one machining station to the subsequent one.

This object has been attained according to this invention by the characterizing features of claim 1. Suitable further developments of the invention can be derived from the dependent claims.

The invention achieves, in a purely mechanical way, such an exact adaptation of the collet chuck to the respective diameter of the round object that the latter while being seized retains its position without having to change the programmed position of the machine carrying the collet chuck. The same holds true if the round object is to be deposited at an exact point in another machining station. It would, of course, be possible for purposes of central gripping to incorporate the varying diameters of the round objects into the control program for the machine carrying the collet chuck, although it would be necessary for this purpose to determine not only the respective diameter, but also the respective position of the round object in order to vary the control program proportionately so that also the respective gripping and/or depositing position of the machine is changed. However, this would make the software for program control more complicated and the hardware more expensive; this is avoided by the collet chuck according to this invention.

One embodiment of the collet chuck of this invention is illustrated in the drawing showing a top view.

The illustrated collet chuck for the centered seizing of a round object (1) exhibits a collet head (2) mounted to a corresponding machine, not shown, two collet arms (4) being arranged at this collet head to be pivotable about points of articulation (3). The collet arms are connected via respectively one fishplate (5) with the piston rod (6) of a drive cylinder (7) which latter swings the collet arms (4) inwards and outwards upon appropriate operation. In place of the drive cylinder (7), it is also possible to use another drive means for the pivoting of the collet arms (4).

A collet jaw (9) is supported at the outer end of each collet arm (4), to be pivotable about a point of articulation (8), this collet jaw being connected by way of a further point of articulation (10) and a guide arm (11) with a point of articulation (12) fixedly located at the collet head (2). Two centering rollers (13) are mounted at a mutual spacing in a freely rotatable fashion at each collet jaw (9), and the arrangement of the points of articulation (3, 8, 10, 12), forming a link quadrilateral or pseudo parallelogram, is such that, as indicated on the left-hand side of the drawing, the mid-perpendicular (14) on the connection line (15) between the axes of the centering rollers (13) extends in all instances through the center (M) of the round object (1).

According to the illustration, the centering rollers (13) have already made contact with the round object (1). In this position, the mid-perpendicular (14) extends, for geometrical reasons alone, perforce through the center (M) of the round object (1), namely for the simple reason that the connecting line (15) is a parallel-shifted chord with respect to the illustrated circle of the round object (1), and the mid-perpendicular on a chord extends in all cases through the center of the circle. Therefore, the illustration in the drawing must not lead one to overlook that the conditions existing herein are nowise self-evident geometrically; this will be explained as follows:

During closing of the collet jaws (9), the mid-perpendicular (14) associated with each collet jaw (9) continuously changes its angular position with respect to an imaginary fixed radius (R) of the round object (1), shown in the drawing as a circle, namely in such a way that this mid-perpendicular (14), in case of a large opening width of the collet, forms an angle below the imaginary radius (R); this angle, in case of a diminishing opening width, is displaced up to above the radius (R), as indicated at (14'). If, now, each collet arm (4) were to constitute a rigid unit with the associated collet jaw (9), so that in particular the point of articulation (8) and the guide arm (11) would have to be assumed to be eliminated, then the mid-perpendicular (14) would, upon closing of the collet chuck, not only vary its angular position with respect to the radius (R), but also the point of intersection of the mid-perpendiculars (14) of both collet jaws (9) would be displaced from the center (M), namely during closing of the collet in the direction toward the collet head (2). In order to compensate for this displacement, the link quadrilaterals (pseudo parallelograms) formed by the respective points of articulation (3, 8, 10, 12) are provided which take care that, during closing of the collet chuck, from the largest opening width up to the smallest, the collet jaws (9) are pivoted about their respective point of articulation (8) gradually toward the outside with respect to the associated collet arm (4). As a result, in any pivoting position, i.e. at any opening width, the mid-perpendiculars (14) will extend through the center (M); consequently, during closing of the collet chuck, all four lines of contact of the centering rollers (13) engage the round object (1) at the same time, no matter which diameter, within the covered diameter range, is exhibited by this round object.

Optimum centering accuracy is attained by providing that the effective length of the guide arm (11) between the point of articulation (10) located at the collet jaw (9) and the point of articulation (12) fixedly located at the machine is shorter than the effective length of the collet arm (4) between the point of articulation (8) located at the collet jaw (9) and the point of articulation (3) affixed to the machine.

Instead of being engaged by the centering rollers (13), the round object (1) can also be engaged by solid radii at the collet jaws (9). The centering rollers (13) are merely to serve for reducing friction on the round object (1) and thus improving the centering ability of the collet chuck. This centering ability is required in case round objects must be seized from a position wherein the center of the round object deviates from the center of the collet chuck, for example on account of an inaccurate placement of the round object at a receiving point.

The drawing indicates, in thinner lines, at (9'), the smallest possible closing position of the collet jaws (9). In this case, the round object (1') is no longer in contact with the four centering rollers (13) but rather contacts four points (and/or lines) formed by circular-arc-shaped recesses (16) of the collet jaws (9). The recesses (16) exhibit a radius that is smaller than the radius of the smallest round object (1') that can be seized. If desired, additional, smaller centering rollers (17) can be provided in the zone of the recesses (16), as indicated in dot-dash lines on the left-hand side in the drawing. These additional rollers can be arranged so that the mid-perpendicular on the connecting line between their axes is congruent with the mid-perpendicular (14, 14') associated with the aforementioned, larger centering rollers (13), as described above. However, optionally the smaller centering rollers (17) can also be arranged so that the mid-perpendicular associated therewith is offset with respect to the mid-perpendicular (14) pertaining to the larger centering rollers (13) in order to even more accurately compensate for small centering errors within the range of diameters of the round object (1 and, respectively, 1') covered by the smaller centering rollers (17), or to obtain intentionally a different center position for this diameter range.

What is claimed is:

1. Mechanically operated collet chuck for gripping round objects, with collet arms uniformly pivotable on a collet head, the front ends of these collet arms engaging at two different circumferential points of the round object, characterized in that collet jaws (9) are pivotably mounted to the front ends of the collet arms (4) and can be pivoted by way of respectively one link quadrilateral (3, 8, 10, 12) perforce with respect to the collet arms (4) in such a way that, in every opening position of the same, the mid-perpendicular (14) on the connecting lines (15) between the contact points of the collet jaws (9) extends through the center (M) of the round object (1) to be gripped, i.e. the four contact points or contact lines of the collet jaws (9), with the position of the round object (1) being unchanged and with the gripping or setting-down position of the machine being unchanged, come into contact with the round object (1) simultaneously.

2. Collet chuck according to claim 1, characterized in that each link quadrilateral is formed by two fixed points of articulation (3, 12) and two points of articulation (8, 10) located at the associated collet jaw (9), the two inwardly disposed points of articulation (3, 8) being connected by the collet arm (4), and the two outwardly disposed points of articulation (10, 12) being connected by a guide arm (11) exhibiting a shorter effective length than the length of the collet arm (4).

3. Collet chuck according to claim 1, characterized in that respectively two mutually spaced-apart, freely rotatably mounted centering rollers (13) are provided at the collet jaws (9).

4. Collet chuck according to claim 3, characterized in that respectively one recess (16) is provided at the collet jaws (9) between the centering rollers (13), this recess having a radius smaller than the radius of the smallest round object (1') to be gripped.

5. Collet chuck according to claim 4, characterized in that two additional, small centering rollers (17) are provided in the region of the recess (16) of each collet jaw (9) and are arranged so that the mid-perpendicular on the connecting line of their axes extends, in every opening position of the collet arms (9), through the center of the round object (1') to be gripped.

6. Collet chuck according to claim 5, characterized in that the mid-perpendicular associated with the additional, smaller centering rollers (17) is congruent with the mid-perpendicular (14) associated with the larger centering rollers (13).

7. Collet chuck according to claim 5, characterized in that the mid-perpendicular associated with the additional, smaller centering rollers (17) is offset with respect to the mid-perpendicular (14) associated with the larger centering rollers (13) in order to compensate for slight centering errors in the small diameter range of the round object (1, 1').

* * * * *